(12) United States Patent
Down et al.

(10) Patent No.: US 10,578,407 B2
(45) Date of Patent: Mar. 3, 2020

(54) SYSTEM FOR DEPLOYING A FIRST OBJECT FOR CAPTURING, INHIBITING, IMMOBILISING OR DISABLING A SECOND OBJECT

(71) Applicants: OPENWORKS ENGINEERING LTD, Northumberland (GB); Christopher David Down, Newcastle (GB); Neil Rockcliffe Armstrong, Rowlands Gill (GB); James Edward Cross, Blaydon (GB); Alexander James Wilkinson, Newcastle (GB); Roland Sebastian Wilkinson, Newcastle (GB)

(72) Inventors: Christopher David Down, Newcastle (GB); Neil Rockcliffe Armstrong, Rowlands Gill (GB); James Edward Cross, Blaydon (GB); Alexander James Wilkinson, Newcastle (GB); Roland Sebastian Wilkinson, Newcastle (GB)

(73) Assignee: OPENWORKS ENGINEERING LTD, Northumberland (GB)

( * ) Notice: Subject to any disclaimer, the term of this patent is extended or adjusted under 35 U.S.C. 154(b) by 0 days.

(21) Appl. No.: 15/577,978

(22) PCT Filed: Jun. 1, 2016

(86) PCT No.: PCT/GB2016/051607
§ 371 (c)(1),
(2) Date: Nov. 29, 2017

(87) PCT Pub. No.: WO2016/193722
PCT Pub. Date: Dec. 8, 2016

(65) Prior Publication Data
US 2018/0292184 A1    Oct. 11, 2018

(30) Foreign Application Priority Data

Jun. 1, 2015 (GB) .................................. 1509456.8
Jun. 1, 2015 (GB) .................................. 1509457.6
Jan. 22, 2016 (GB) .................................. 1601228.8

(51) Int. Cl.
*F41H 11/02* (2006.01)
*F41H 13/00* (2006.01)
(Continued)

(52) U.S. Cl.
CPC ......... *F41H 11/02* (2013.01); *F41H 13/0075* (2013.01); *F41H 13/0093* (2013.01);
(Continued)

(58) Field of Classification Search
CPC .. F41H 11/02; F41H 13/0075; F41H 13/0093; F41B 12/36; B64C 39/024; F41G 7/224
(Continued)

(56) References Cited

U.S. PATENT DOCUMENTS

| | | | |
|---|---|---|---|
| 1,309,530 A | 7/1919 | Lamberson | |
| 4,967,667 A * | 11/1990 | Horwath | F42B 12/32 |
| | | | 102/494 |

(Continued)

FOREIGN PATENT DOCUMENTS

| | | |
|---|---|---|
| DE | 8536735 U | 9/1987 |
| DE | 19952437 A | 5/2001 |

(Continued)

OTHER PUBLICATIONS

U.S. Appl. No. 15/567,743, filed Oct. 19, 2017, Down et al.
(Continued)

*Primary Examiner* — Samir Abdosh
(74) *Attorney, Agent, or Firm* — Jason H. Vick; Sheridan Ross, PC

(57) ABSTRACT

A system for inhibiting the electronic system of a target object is provided. The system comprises an Electronic (Continued)

Counter Measure (ECM) unit, and a projectile for carrying the ECM unit towards the target object.

16 Claims, 4 Drawing Sheets

(51) Int. Cl.
    *F42B 12/36*     (2006.01)
    *B64C 39/02*     (2006.01)
    *F41G 7/22*     (2006.01)
(52) U.S. Cl.
    CPC ............ *F42B 12/36* (2013.01); *B64C 39/024* (2013.01); *F41G 7/224* (2013.01)
(58) Field of Classification Search
    USPC .......................................................... 89/1.11
    See application file for complete search history.

(56) References Cited

U.S. PATENT DOCUMENTS

| | | | |
|---|---|---|---|
| 5,192,827 A | 3/1993 | Jasper, Jr. | |
| 5,430,448 A * | 7/1995 | Bushman | F41G 7/224 250/372 |
| 5,503,059 A | 4/1996 | Pacholok | |
| 5,583,311 A * | 12/1996 | Rieger | F41H 11/04 102/405 |
| 6,085,735 A | 7/2000 | Cheek, Jr. | |
| 6,626,077 B1 * | 9/2003 | Gilbert | F41H 13/0006 102/400 |
| 6,763,822 B1 | 7/2004 | Styles | |
| 8,205,537 B1 * | 6/2012 | Dupont | F41H 13/0006 102/504 |
| 2005/0168375 A1 * | 8/2005 | Halladay | G01S 7/38 342/14 |
| 2006/0000348 A1 * | 1/2006 | Boyd | F42B 15/12 89/1.11 |
| 2007/0023582 A1 * | 2/2007 | Steele | B64C 39/024 244/190 |
| 2007/0169616 A1 * | 7/2007 | Vickroy | F41H 11/02 89/1.11 |
| 2007/0261542 A1 * | 11/2007 | Chang | F41H 11/02 89/1.11 |
| 2008/0017752 A1 * | 1/2008 | Shukrun | F41H 11/02 244/3.16 |
| 2009/0114761 A1 * | 5/2009 | Sells, II | F41H 11/02 244/3.1 |
| 2009/0288550 A1 * | 11/2009 | Willner | F41H 11/16 86/50 |
| 2010/0181424 A1 | 7/2010 | Goosen et al. | |
| 2010/0282057 A1 * | 11/2010 | Rapp | F41A 1/08 89/14.3 |
| 2011/0101097 A1 | 5/2011 | Olden et al. | |
| 2011/0226889 A1 * | 9/2011 | Rovinsky | F41G 7/007 244/3.11 |
| 2012/0210904 A1 * | 8/2012 | Merems | F41H 11/02 102/504 |
| 2014/0216290 A1 * | 8/2014 | Yee | F41H 11/02 102/374 |
| 2014/0331984 A1 | 11/2014 | Brahler, II et al. | |
| 2017/0059692 A1 * | 3/2017 | Laufer | G01S 7/38 |
| 2017/0101179 A1 * | 4/2017 | Michael | B64C 39/024 |
| 2018/0335779 A1 * | 11/2018 | Fisher | G05D 1/0094 |

FOREIGN PATENT DOCUMENTS

| | | |
|---|---|---|
| EP | 2138802 A1 | 12/2009 |
| FR | 2965908 A | 4/2012 |
| GB | 2487664 | 8/2012 |
| SE | 456813 B | 11/1988 |
| WO | WO 97/14931 | 4/1997 |
| WO | WO 2008/050343 | 5/2008 |
| WO | WO 2016/170367 | 10/2016 |

OTHER PUBLICATIONS

International Preliminary Report on Patentability for International Application No. PCT/GB2016/051607 dated Dec. 5, 2017.
Bagley Stamping Blog "Rag Rug—Bagley Stamping" WorldPress.com; Available from https://bagleystamping.wordpress.com/category/rag-rug/; Feb. 16, 2010.
Bunting PartyDelights, PartyDelights.co.uk; Available from: http://www.partydelights.co.uk/decorations/bunting.aspx?pmo=7&gclid=CLvH-6ncuscoCFSUewwodOCcG5Q; Accessed Jan. 21, 2016.
QinetiQ Ltd. "X-Net: Exceptional Vehicle Stopping Power. Breakthrough Technology" Available from: http://qinetiq.com/services-products/survivability/infrastructure-and-base-protections/Documents/Xnet.pdf; 2009.
International Search Report for International Application No. PCT/GB2016/051607 dated Sep. 7, 2016.
Written Opinion for International Application No. PCT/GB2016/051607 dated Sep. 7, 2016.
International Search Report for International Application No. PCT/GB2016/051139, dated Jul. 26, 2016.
Written Opinion for International Application No. PCT/GB2016/051139, dated Jul. 26, 2016.
International Preliminary Report on Patentability for International Application No. PCT/GB2016/051139, dated Nov. 2, 2017.
Search Report for Great Britain Patent Application No. GB 1506889.3, dated Dec. 15, 2015.
Search Report for Great Britain Patent Application No. GB 1509456.8, dated Jan. 22, 2016.
Search Report for Great Britain Patent Application No. GB 1509457.6, dated May 10, 2016.
Search Report for Great Britain Patent Application No. GB 1601228,8, dated Mar. 14, 2016.
Office Action (Restriction Requirement) for U.S. Appl. No. 15/567,743, dated Oct. 4, 2018.
Office Action for U.S. Appl. No. 15/567,743, dated Oct. 2, 2019.

* cited by examiner

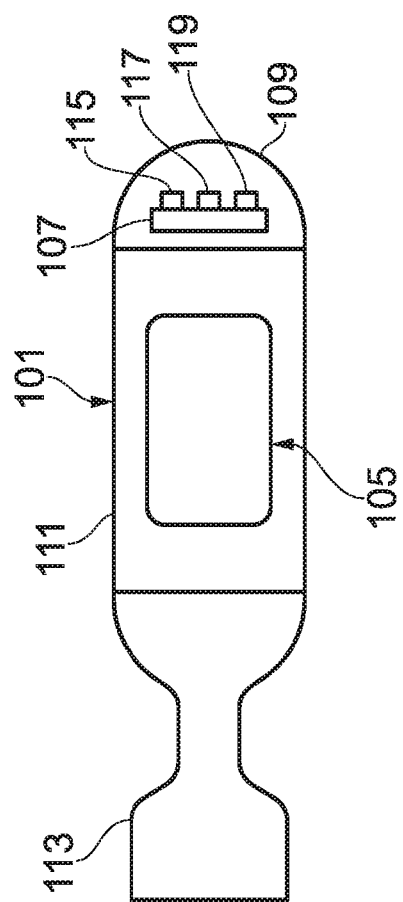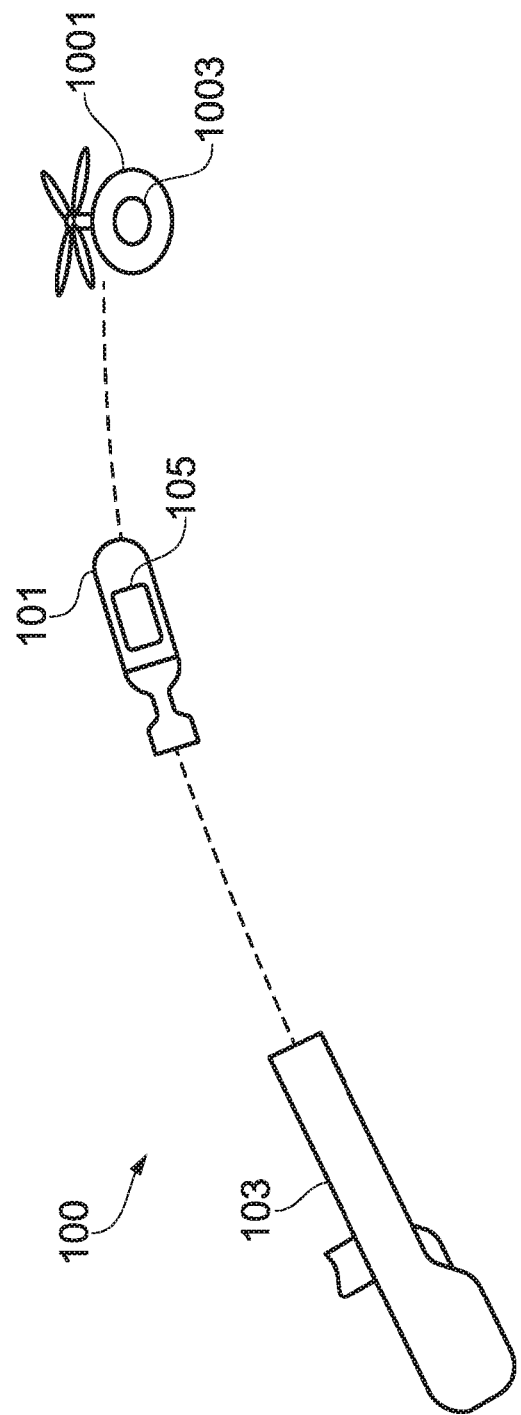

SYSTEM FOR DEPLOYING A FIRST OBJECT FOR CAPTURING, INHIBITING, IMMOBILISING OR DISABLING A SECOND OBJECT

CROSS REFERENCE TO RELATED APPLICATIONS

This application is a national stage application under 35 U.S.C. 371 of PCT Application No. PCT/GB2016/051607, having an international filing date of 1 Jun. 2016, which designated the United States, which PCT application claimed the benefit of Great Britain Application Nos. 1509457.6, filed 1 Jun. 2015, 1509456.8, filed 1 Jun. 2015, and 1601228.8, filed 22 Jan. 2016, and claimed the benefit of International Application No. PCT/GB2016/051139, filed 11 Apr. 2016, each of which are incorporated herein by reference in their entirety.

FIELD OF THE INVENTION

The present invention relates to a system for deploying a first object for capturing, inhibiting, immobilising or disabling a second object. For example, certain exemplary embodiments provide a system for deploying an Electronic Counter-Measure (ECM) to capture, inhibit, immobilise or disable an electronic device or system that is located a relatively large distance from an operator of the system, for example a remote controlled vehicle (e.g. an aerial drone or a remote controlled car or boat), or other electronic device (e.g. an Improvised Explosive Device).

BACKGROUND OF THE INVENTION

The ability to capture, inhibit, immobilise or disable a remote object is desirable in many situations. For example, for reason of security, safety, privacy and/or legality, it is desirable to be able to capture, inhibit, immobile or disable a vehicle, for example that has entered a certain space without authorisation. The problem of unauthorised use of aerial vehicles has increased greatly with the increased commercial availability of cheap, small Unmanned Aerial Vehicles (UAV), for example quadcopters.

There has been increasing concern in the security industry that a UAV or other type of remote-controlled vehicle may be used in an attempted terrorist attack, for example to deliver explosives, or disperse chemical or biological agents, to a crowded area, building, structure or installation. In one possible terrorist scenario, a remote-controlled vehicle such as a UAV may be used to carry an Improvised Explosive Device (IED) to a target area, and then detonation of the IED may be triggered by remote control (e.g. using a modified mobile phone or a modified remote controller for a remote controlled vehicle).

Other examples of unauthorised or undesirable use of UAVs include use of UAVs to smuggle contraband into prisons and across borders, use of UAVs near airports which can be a safety concern due to potential collision with aircraft, and use of UAVs above sports stadia for the purpose of illegal viewing and/or recording of sports events.

Various techniques may be used to capture, inhibit, immobilise or disable an aerial vehicle.

A first technique involves shooting the vehicle down. However, this technique suffers various disadvantages, including (i) being potentially dangerous (for example due to stray bullets or falling debris), (ii) being liable to cause the public worry or anxiety, (iii) potentially destroying the vehicle and/or useful forensic evidence, and (iv) in the case of an attempted terrorist attack, possibly causing detonation of any explosives, or release of any chemical or biological agents, being carried by the vehicle.

Other techniques involve using a second aerial vehicle (e.g. a UAV) to intercept and capture the first aerial vehicle while it is still in the air, or using a conventional net gun to bring down the aerial vehicle. However, these techniques do not prevent remote triggering of an IED or other electronic device carried by the aerial vehicle.

It is also desirable to inhibit or disable electronic systems or devices other than vehicles. For example, in another possible terrorist scenario, an IED may be carried by a person to a target area and later detonated by remote control.

Electronic Counter Measures (ECMs—PT2556385) are used by armies to prevent their enemy from remotely detonating IEDs. Conventional ECMs inhibit the operation of many types of electronic devices within a relatively large radius. Accordingly, they are unsuitable for protecting large public areas, since the operation of many electronic devices other than a suspect IED, for example personal electronic devices carried by members of the public, would also be inhibited, causing inconvenience and disruption to daily life.

A further technique for inhibiting an aerial vehicle involves using a device to fire a jamming signal, in the form of an intense beam of radio frequency signals, at the aerial vehicle from the ground in order to interfere with the operation of the aerial vehicle. One problem with this technique is that the jamming signal can dangerously interfere with aerial objects other than the target aerial vehicle, for example aeroplanes.

Accordingly, what is desired is a system for inhibiting, disabling or disrupting the electronic systems or remote control of a remote object (for example a remote-controlled vehicle or IED) while avoiding other electronic devices being inhibited, disabled or disrupted.

The above information is presented as background information only to assist with an understanding of the present disclosure. No determination has been made, and no assertion is made, as to whether any of the above might be applicable as prior art with regard to the present invention.

SUMMARY OF THE INVENTION

It is an aim of certain embodiments of the present invention to address, solve, mitigate or obviate, at least partly, at least one of the problems and/or disadvantages associated with the related art, for example at least one of the problems and/or disadvantages mentioned herein. Certain embodiments of the present invention aim to provide at least one advantage over the related art, for example at least one of the advantages mentioned herein.

The present invention is defined by the independent claims. A non-exhaustive set of advantageous features that may be used in various exemplary embodiments of the present invention are defined in the dependent claims.

In accordance with an aspect of the present invention, there is provided a system for inhibiting the electronic system of a target object, the system comprising: an Electronic Counter Measure (ECM) unit; and a projectile for carrying the ECM unit towards the target object.

In certain exemplary embodiments, the system further comprises a launcher for launching the projectile towards the target object.

In accordance with another aspect of the present invention, there is provided a method for inhibiting the electronic system of a target object, the method comprising launching a projectile comprising an ECM towards the target object.

In accordance with another aspect of the present invention, there is provide a computer program comprising instructions arranged, when executed, to implement a method, device, apparatus and/or system in accordance with any aspect, embodiment, example or claim disclosed herein. In accordance with another aspect of the present invention, there is provided a machine-readable storage storing such a program.

Other aspects, advantages, and salient features of the present invention will become apparent to those skilled in the art from the following detailed description, which, taken in conjunction with the annexed drawings, disclose exemplary embodiments of the present invention.

BRIEF DESCRIPTION OF THE FIGURES

FIG. 1 illustrates a system according to an exemplary embodiment of the present invention;

FIG. 2 illustrates an exemplary projectile for use in the system of FIG. 1;

DETAILED DESCRIPTION OF EXEMPLARY EMBODIMENTS

Figure 3:
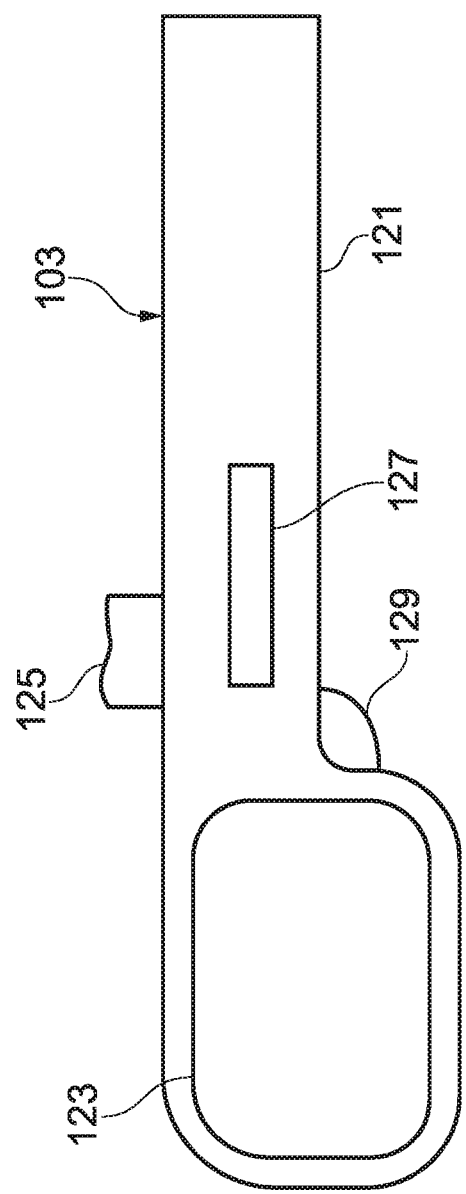
FIG. 3 illustrates an exemplary launcher for use in the system of FIG. 1.

The following description of exemplary embodiments of the present invention, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the present invention, as defined by the claims.

The terms and words used in this specification are not limited to the bibliographical meanings, but, are merely used to enable a clear and consistent understanding of the present invention.

The same or similar components may be designated by the same or similar reference numerals, although they may be illustrated in different drawings.

Detailed descriptions of elements, features, components, structures, constructions, functions, operations, processes, characteristics, properties, integers and steps known in the art may be omitted for clarity and conciseness, and to avoid obscuring the subject matter of the present invention.

Throughout this specification, the words "comprises", "includes", "contains" and "has", and variations of these words, for example "comprise" and "comprising", means "including but not limited to", and is not intended to (and does not) exclude other elements, features, components, structures, constructions, functions, operations, processes, characteristics, properties, integers, steps and/or groups thereof.

Throughout this specification, the singular forms "a", "an" and "the" include plural referents unless the context dictates otherwise. For example, reference to "an object" includes reference to one or more of such objects.

By the term "substantially" it is meant that the recited characteristic, parameter or value need not be achieved exactly, but that deviations or variations, including for example, tolerances, measurement errors, measurement accuracy limitations and other factors known to those of skill in the art, may occur in amounts that do not preclude the effect the characteristic, parameter or value was intended to provide.

Throughout this specification, language in the general form of "X for Y" (where Y is some action, process, function, activity, operation or step and X is some means for carrying out that action, process, function, activity, operation or step) encompasses means X adapted, configured or arranged specifically, but not exclusively, to do Y.

Elements, features, components, structures, constructions, functions, operations, processes, characteristics, properties, integers, steps and/or groups thereof described herein in conjunction with a particular aspect, embodiment, example or claim are to be understood to be applicable to any other aspect, embodiment, example or claim disclosed herein unless incompatible therewith.

It will be appreciated that embodiments of the present invention can be realized in the form of hardware or a combination of hardware and software. Any such software may be stored in any suitable form of volatile or non-volatile storage device or medium, for example a ROM, RAM, memory chip, integrated circuit, or an optically or magnetically readable medium (e.g. CD, DVD, magnetic disk or magnetic tape). It will also be appreciated that storage devices and media are embodiments of machine-readable storage that are suitable for storing a program or programs comprising instructions that, when executed, implement embodiments of the present invention.

Certain embodiments of the present invention provide a system for deploying a first object for capturing, inhibiting, immobilising or disabling a second object. An exemplary system embodying the present invention comprises the first object, a projectile and a launcher. The projectile is configured for transporting the first object to the vicinity of the second object. The launcher is configured for launching the projectile. Accordingly, the first object is deployed in the vicinity of the second object. The first object is configured for capturing, inhibiting, immobilising or disabling the second object. The first object comprises an ECM. The second object may comprise an electronic device or electronic system, or a device or machine including an electronic device or electronic system (e.g. a remote-controlled vehicle or remote-controlled device).

The skilled person will appreciate that certain parts of the system described above may be provided separately in various embodiments of the present invention. For example, certain embodiments of the present invention may comprise the projectile and the ECM only. In this case, the launcher may be provided separately. As another example, certain embodiments of the present invention may comprise the ECM alone. In this case, the projectile and/or launcher may be provided separately.

Various features of an exemplary embodiment will now be described in detail. It is understood that these features may be provided in any suitable combination in various embodiments. For example, in certain embodiments, one or more features may be omitted, one or more additional features may be provided, and/or one or more features may be replaced with one or more alternative features for performing equivalent functions.

Overall System

FIG. 1 illustrates a system according to an exemplary embodiment of the present invention. This embodiment is described below in relation to disabling, capturing, inhibiting or immobilising an aerial vehicle 1001 (for example an aerial drone) using a projectile 101 to deploy an Electronic Counter-Measure (ECM) 105 having a relatively small radius of influence. However, the skilled person will appreciate that the present invention is not limited to these specific examples. For example, various embodiments may be used for capturing, inhibiting, immobilising or disabling other types of object, for example land-based or water-based vehicles, and objects other than vehicles (e.g. an IED).

The system 100 illustrated in FIG. 1 comprises a projectile 101, a launcher 103 for launching or firing the projectile 101, and an ECM 105 provided in or on the projectile 101. In summary, the launcher 103 launches the projectile 101 including the ECM 105 towards a target object 1001 (e.g. an aerial vehicle). The projectile 101 comprises means (not shown in FIG. 1) for attaching the projectile 101 to the target object 1001 when the projectile 101 is in the vicinity of the target object 1001 or when the projectile 101 impacts (or collides with) the target object 1001. When the projectile 101 becomes attached to the target object 1001, the ECM 105 disables, inhibits or disrupts operation or functioning of the target object (or objects carried by the target object, such as an IED 1003, which may be regarded herein as being part of the target object).

Electronic Counter-Measure (ECM)

The ECM 105 may comprise any suitable device for inhibiting, disrupting, disabling or interfering with the electronic components or operation of the target object 1001, 1003, for example the electronic control systems and/or the remote control systems of the target object 1001, 1003. For example, the ECM 105 may comprise a device for transmitting radio signals that disrupt communications between the target object 1001, 1003 and a remote controller of the target object 1001, 1003 by decreasing the signal-to-noise ratio to a point at which the communication link is either degraded or denied service. The skilled person will appreciate that the present invention is not limited to this specific example, and that any suitable type of ECM 105 may be provided.

In certain embodiments, the ECM 105 may be adapted to have a relatively small Radius (or Region) of Influence (ROI). The ROI of an ECM is a region (e.g. a sphere surrounding the ECM) in which the influence of the ECM is sufficiently high to inhibit, disrupt, disable or interfere with an electronic device or system, for example to render the electronic device, or remote control of the electronic device, unusable. In particular, the ROI of the ECM 105 may be chosen such that, when the projectile 101 becomes attached to the target object 1001, 1003, the target object 1001, 1003 is located at least partly inside the ROI so as to inhibit, disrupt, disable or interfere with operation of the target object 1001, 1003. On the other hand, the ROI of the ECM 105 may be chosen such that, when the projectile 101 becomes attached to the target object 1001, 1003, objects other than the target object 1001, 1003 are located outside the ROI so as not to be inhibited, disrupted, disabled or interfered with by the ECM 105.

For example, the ROI may be chosen according to the physical dimensions of the target object 1001, 1003 and/or the attachment element used to attach the projectile/ECM to the target object (see below). For example, the ROI may be chosen to be less than or equal to R, where R is a value chosen based a one or more size parameters of the target object 1001, 1003 and/or the attachment element. For example, in the case of an aerial drone the size parameters may include the diameter of the drone, and in the case of a car the size parameters may include the length of the wheel base. In the case that a net or tether is used to attach the projectile/ECM to the target object, the size parameters may include the dimensions of the net or the length of the tether. In this case, the projectile/ECM may not be directly attached to the target object (rather it may be indirectly attached via the net or tether), and so in this case the value of R should be correspondingly larger.

The value R may be chosen according to any suitable function of the size parameters. For example, R may be chosen to be equal to the size parameter, equal to a fixed multiple or fraction of the size parameter, or equal to a value obtained by adding or subtracting a fixed amount to or from the size parameter.

Typical values for R in various exemplary embodiments may be 1 metre, 2 metres, 3 metres, 4 metres, 5 metres, 6 metres, 7 metres, 8 metres, 9 metres and 10 metres.

In certain embodiments, the ROI of the ECM 105 may be fixed. In other embodiments, the ROI may be adjustable, for example according to the selection of an operator. For example, in the case that the ECM 105 comprises a device for transmitting radio signals, the ROI may be adjusted by adjusting the intensity of the radio signals. Accordingly, if the target object 1001, 1003 is relatively large (e.g. a full-size car), then the ROI may be adjusted to have a relatively large value (e.g. 4 metres). On the other hand, if the target object 1001, 1003 is relatively small (e.g. a quadcopter of 1 metre diameter), then the ROI may be adjusted to have a relatively small value (e.g. 2 metres).

In certain embodiments, the ROI of the ECM 105 may be adjusted, for example prior to launch of the projectile 101. For example, in certain embodiments the projectile 101 may comprise an input interface for receiving a selection of an ROI from the operator, and the ECM 105 may be programmed with the selected ROI accordingly. Alternatively, the launcher 103 may comprise an input interface for receiving a selection of an ROI from the operator, and the launcher 103 may be configured to provide ECM programming signals to the projectile 101 while the projectile 101 is loaded in the launcher 103 (e.g. through appropriate electrical contacts provided in the launcher 103 and the exterior of the projectile 101), and the ECM 105 may be programmed with the selected ROI accordingly. In other embodiments, the ROI may be programmed remotely following launch of the projectile 101.

In certain embodiments, the ECM 105 may be adapted to be selectively activated, for example upon occurrence of a certain event. Various examples are described further below.

Projectile

FIG. 2 illustrates a projectile 101 for use in the system 100 of FIG. 1. The projectile 101 may comprise any suitable type of projectile 101 for carrying the ECM 105. The skilled person will appreciate that the present invention is not limited to the specific examples disclosed herein.

The projectile 101 comprises a case for carrying the ECM 105 and control circuitry 107 for controlling the ECM 105. In the illustrated example, the case is provided in the form of an elongate casing comprising a front nose section 109, a generally cylindrical middle body section 111, and a rear tail section 113. The nose section 109 may be suitably shaped to reduce aerodynamic drag on the projectile 101 during flight. The tail section 113 may comprise a number of flights or tail pieces for improving aerodynamic stability of the projectile 101 during flight.

The ECM 105 may be carried by the projectile 101 in any suitable manner. For example, in certain embodiments the ECM 105 may be embedded or otherwise provided inside the case, for example within the nose section 109, the body section 111 and/or the tail section 113. In this case, the projectile 101 may be made from a material that allows the signals transmitted by the ECM 105 to pass through, for example plastic. Alternatively, the ECM 105 may be provided at least partly on the exterior of the case. In the example of FIG. 2, the ECM 105 is provided inside the body section 111 and the control circuitry 107 is provided inside the nose section 109, although the skilled person will appreciate that the present invention is not limited to this specific example.

The projectile further comprises means for attaching the projectile 101 or ECM 105 to the target object 1001, 1003 (which may be referred to as an attachment element) when the projectile 101 is located in the vicinity of the target object 1001, 1003 or when the projectile 101 impacts the target object 1001, 1003. This ensures that the ROI of the ECM 105 remains close to the target object 1001, 1003. A number of possible examples of the attachment element are described below. However, the skilled person will appreciate that the present invention is not limited to these specific examples.

In a first example, the attachment element may comprise a relatively sticky substance, for example provided on at least a portion of the exterior of the projectile 101. In this case, when the projectile 101 impacts the target object 1001, 1003, the sticky substance causes the projectile 101 to adhere to the target object 1001, 1003. In certain embodiments, the projectile 101 may be provided with a sheath, cover or other layer that protects or covers the sticky portions of the projectile 101 prior to launch, and which is adapted to be released or removed during or following launch of the projectile 101, thereby revealing the sticky portions. For example, the projectile 101 and launcher 103 may be designed such that the sheath, cover or layer is released, pulled off or otherwise removed upon exit of the projectile 101 from the barrel of the launcher 103. Alternatively, the sheath, cover or layer may be released or removed by any suitable mechanism during flight of the projectile 101. In a further example, the ECM 105 may be embedded within a ball of glue or the like. In this case, the ball of glue may be provided on the front of the projectile 101 so that the ball of glue adheres to the target object 1001, 1003 upon impact. In certain embodiments, the ball of glue may be adapted to separate from the projectile upon impact with the target object 1001, 1003, leaving the ball of glue and ECM 105 therein attached to the target object 1001, 1003.

In a second example, the attachment element may comprise one or more elements (e.g. provided on the exterior of the projectile 101 or deployed from within the projectile 101) for tangling, hooking and/or snagging the target object 1001, 1003 when the projectile 101 impacts the target object 1001, 1003. For example, the elements may comprise one or more hooks and/or one or more flexible members.

In a third example, the attachment element may comprise one or more sharp points provided on the exterior of the projectile 101 and configured to pierce the target object 1001, 1003 when the projectile 101 impacts the target object 1001, 1003. For example, the nose section 109 of the projectile 101 may comprise a sharpened point. The sharp points may be provided with barbs or the like to provide a more secure attachment.

In a fourth example, the attachment element may comprise a net, or a manifold of a type other than a net (e.g. a blanket or membrane), for tangling the target object 1001, 1003. The net may be packaged in the projectile 101, and the projectile 101 may comprise a deployment mechanism for deploying the net during flight at the appropriate time such that the deployed net tangles the target object 1001, 1003. For example, the deployment mechanism may comprise a first mechanism for separating the projectile into two or more parts to open a compartment in which the net is packaged, and a second mechanism for releasing the net from the compartment such that the net travels towards the target object 1001, 1003 and expands as it travels. Following deployment, the net may be attached to the projectile 101, for example by a tether, and the ECM 105 may remain in or on the projectile 101. Alternatively, following deployment, the net may become separated from the projectile 101, and the ECM 105 may be attached to the net and be deployed along with the net. The time at which the net is deployed may be controlled by a timing parameter, which may be computed for example based on the trajectory of the projectile 101 and the position of the target object 1001, 1003. For example, the timing parameter may be computed by the launcher 103 and may be programmed into the control circuitry 107 prior to launch. A technique for deploying a net to capture a target object is described in UK Patent Application GB 1601228.8 and International Patent Application PCT/GB2016/051139.

The skilled person will appreciate that an attachment element may not be required in some embodiments. For example, in the case that the target is on the ground and static, the projectile may be launched so as to land close to the target object, but it may not be necessary to physically attach the projectile or the ECM to the target object in this case.

In certain embodiments, the projectile may further comprise a parachute, which may be deployed in the event the target object 1001, 1003 falls to the ground. The projectile may comprise any suitable mechanism for deploying the parachute. The skilled person will appreciate that a parachute is not required in certain embodiments.

One or more electrical contacts may be provided on the exterior surface of the projectile 101. The contacts are electrically connected to inputs of the control circuitry 107 and provide an external interface for the control circuitry 107. In particular, the contacts of the projectile 101 are arranged to connect with a corresponding set of contacts provided in the launcher 103 when the projectile 101 is loaded into the launcher 103. In this way, the launcher 103 may transmit various signals to the projectile 101. Projectile Control Circuitry The control circuitry 107 comprises a power source 115 for powering the electrical components of the projectile 101, an event occurrence detection module 117 for detecting occurrence of an event for triggering activation of the ECM 105, and a processor (or controller) 119 for controlling overall operation of the control circuitry 107 and the ECM 105.

As mentioned above, in certain embodiments, the ECM 105 may be adapted to be selectively activated, for example upon occurrence of a certain event.

In one example, the ECM 105 may be activated upon detection of impact between the projectile 101 and the target object 1001, 1003. In this case, the event occurrence detection module 117 comprises an accelerometer or any other suitable type of sensor for detecting a high level of deceleration of the projectile 101 characteristic of such an impact. The accelerometer may continually output measured acceleration/deceleration data to the processor 119, and when the measure level of deceleration is greater that a certain threshold, the processor 119 determines that the projectile 101 has impacted the target object 1001, 1003 and controls activation of the ECM 105.

In another example, an impact between the projectile 101 and the target object 1001, 1003 may be detected from a force resulting from physical connection between the projectile 101 and the target object 1001, 1003. In this case, the event occurrence detection module 117 comprises a pressure sensor, button or the like provided on the exterior of the projectile (e.g. the tip of the nose section 109) configured to be activated by the force of the impact. In this case, when activated, the sensor or button transmits a signal to the processor 119, and in response the processor 119 controls activation of the ECM 105.

In another example, the ECM 105 may be activated a certain time period after the projectile 101 is launched from the launcher 103. For example, the time period may be chosen as the time of flight of the projectile 101 before becoming attached to the target object, and may be determined based on the trajectory of the projectile 101 and the position of the target object 1001, 1003. In the case that a deployed net is used as the attachment element, the ECM may be activated based on the same time parameter used to determining timing of net deployment. In this example, the event occurrence detection module 117 comprises a timer configured to be initialised at the time of launch of the projectile 101 and configured to output a timer signal to the processor 119 upon lapse of the appropriate time period. In response to receiving the timer signal, the processor 119 controls activation of the ECM 105.

In yet another example, the ECM 105 may be activated according to an activation signal, for example transmitted (e.g. by the launcher 103 or another apparatus) under the control of the operator. In this case, the event occurrence detection module 117 comprises a receiver for receiving the activation signal. Upon receiving an activation signal, the receiver outputs a corresponding signal to the processor 119, and in response the processor 119 controls activation of the ECM 105. In certain embodiments, the projectile 101 may receive an activation signal from the launcher 103 when the projectile 101 is loaded in the launcher 103 (e.g. through appropriate electrical contacts provided in the launcher and the exterior of the projectile 101). Alternatively, the projectile 101 may receive an activation signal wirelessly after the projectile 101 has been launched.

In still a further example, the ECM 105 may be manually activated by the operator. In this case, the event occurrence detection module 117 may comprise a button switch or the like provided on the projectile 101. When the operator actuates the button or switch, a corresponding signal is transmitted to the processor 119, and in response the processor 119 controls activation of the ECM 105.

The processor 119 is further configured to control adjustment of the ROI of the ECM 105. For example, while the projectile 101 is loaded in the launcher 103, the processor 119 may receive ECM programming signals from the launcher 103 (e.g. through appropriate electrical contacts provided in the launcher 103 and the exterior of the projectile 101). The CM programming signals indicate an ROI, for example selected by the operator. In response, the processor 119 controls to adjust the ROI of the ECM 105 according to the ROI indicated by the ECM programming signals.

Launcher

The launcher 103 may comprise any suitable launcher for launching the projectile 101. One example of a launcher 103 for use in the system of FIG. 1 is illustrated in FIG. 3.

The launcher 103 may be adapted to be manually operated by a user and supported on the user's shoulder, or may be adapted to be supported at least partially by a stand or placed directly on the ground. Furthermore, in certain embodiments, the launcher 103 may be adapted to be at least partially automated (e.g. by using a camera and image processing, or sensors, to automatically identify and track a target object 1001, 1003).

The launcher 103 comprises a forward facing barrel 121 into which the projectile 101 may be inserted, a firing mechanism 123 located towards the rear of the launcher 103 for firing or launching the projectile 101 from the barrel 121, an aiming system 125 for assisting the user or operator in correctly aiming the barrel 103, control circuitry 127 for controlling overall operation of the launcher 103, and a trigger 129 for triggering launch of the projectile 101.

In certain exemplary embodiments, the firing mechanism 123 may be configured for pneumatically launching the projectile 101. However, the skilled person will appreciate that any other suitable technique for launching the projectile 101 may be used in other embodiments.

One or more electrical contacts may be disposed on the interior of the barrel 121 and arranged such that when the projectile 101 is correctly located at the launch position, the contacts of the launcher 103 connect with corresponding contacts disposed on the exterior of the projectile 101. The contacts of the launcher 103 are electrically connected to outputs of the control circuitry 127 and provide an output interface for the control circuitry 127. In particular, the contacts of the launcher 103 enable the launcher 103 to output various signal to the projectile 101, for example ECM programming signals.

During use, it is difficult for the user to manually determine the correct direction in which to aim the barrel 121. Accordingly, the aiming system 125 is provided to assist the user in correctly aiming the barrel 121, and may optionally be configured to determine an appropriate timing parameter as mentioned above. An exemplary aiming system for use with the launcher 103 is described in UK Patent Application GB 1601228.8 and International Patent Application PCT/GB2016/051139. The aiming system 125 may be configured to aim the barrel 121 such that the projectile 101 intercepts the target object 1001, 1003. Alternatively, for example if a net is used as the attachment element, the aiming system 125 may be configured to aim the barrel 121 such that the projectile 101 itself does not intercept the target object 1001, 1003, but such that the deployed net intercepts the target object 1001, 1003.

Exemplary Scenarios

An exemplary scenario in which a remote-controlled device is disabled using an embodiment of the present invention will now be described with reference to FIGS. 4a and 4b.

A police officer 1005 observes a vehicle (in this case a quadcopter) 1001 carrying a suspect IED 1003. In response, the police officer 1005 loads a projectile 101 including an embedded ECM 105 into the launcher 105. At this point, the ECM 105 is not activated.

The police officer 1005 notes that the vehicle 1001 is a quadcopter and uses the user interface of the launcher 103 to select an appropriate ROI to be set in the ECM 105. For example, the police officer 1005 may input an appropriate ROI value (e.g. 2 metres) directly. Alternatively, the police office 1005 may select "quadcopter" from a list of options provided by the user interface, and the launcher 103 may automatically select an ROI value appropriate for a quadcopter. The launcher 103 then transmits ECM programming signals to the projectile 101 through appropriate electrical contacts. The processor 119 of the projectile 101 receives the ECM programming signals and controls to set the ROI of the ECM 105 accordingly.

Figure 4A:
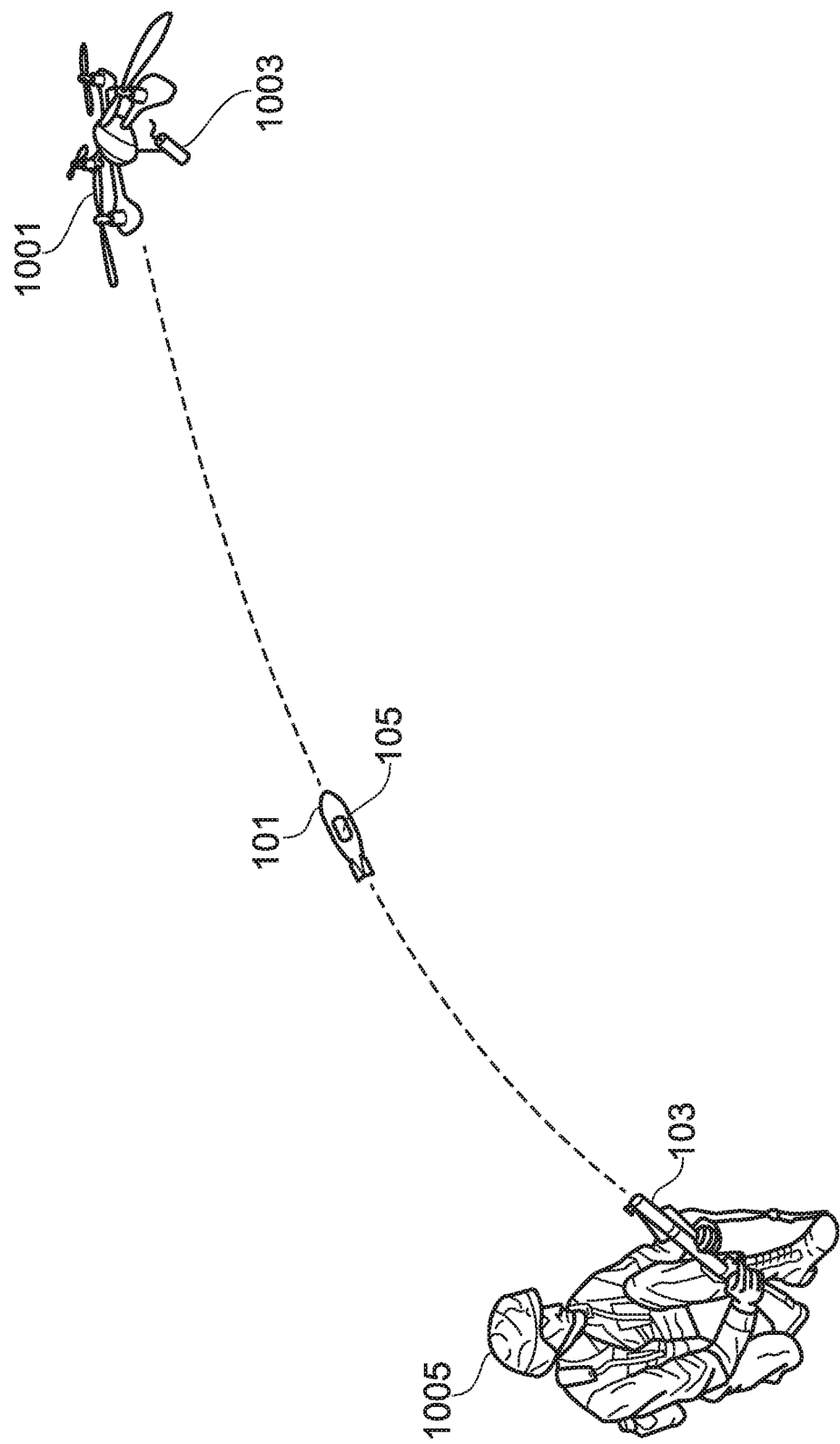
FIGS. 4a and 4b illustrate an exemplary scenario in which a remote-controlled device is disabled using an embodiment of the present invention.

As illustrated in FIG. 4a, the police officer 1005 then uses the launcher 103, with the assistance of the aiming system 125, to launch the projectile 101 towards the target object (quadcopter and suspect IED) 1001, 1003.

As a result of correct aim, the projectile 101 intercepts and impacts the quadcopter 1001. Following impact, the projectile 101 remains attached to the quadcopter 1001 by the attachment element, in this case a sticky substance provided on the exterior of the projectile 101.

The event occurrence detection module 117 of the projectile control circuitry 107, in this case an accelerometer, continuously measures acceleration/deceleration and provides the measurements to the processor 119. Upon impact, the processor 119 determines that the measured deceleration is greater than a certain threshold, and thereby determines occurrence of the impact between the projectile 101 and the quadcopter 1001. Accordingly, the processor 119 controls to activate the ECM 105.

Following activation of the ECM 105, the quadcopter 1001 and IED 1003 are both located within the ROI 1008 of the ECM 105. Accordingly, the electronic control systems of the quadcopter 1001 and the IED 1003 are disabled. Accordingly, triggering of the IED 1003 is prevented. Furthermore, the disabled quadcopter 1003, along with the IED 1003, and attached projectile 101 and ECM 105, fall to the ground. Deployment of a parachute provided within the projectile 101 may achieve controlled descent, reducing the risk to people and objects below.

Figure 4B:
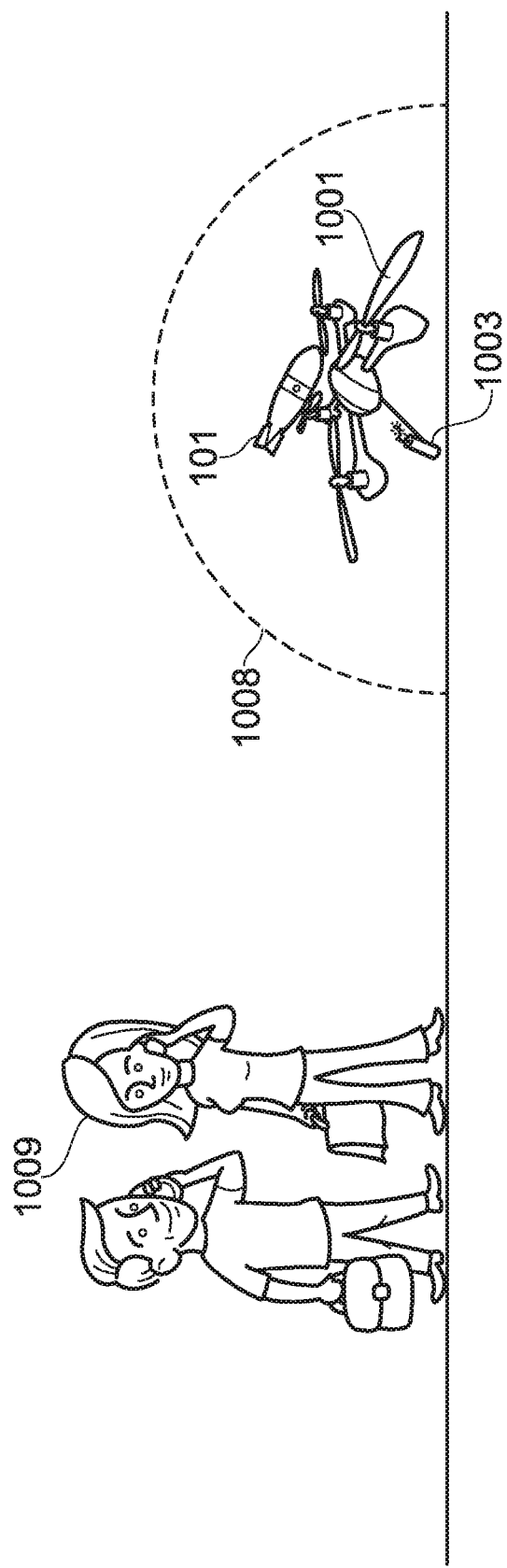

As illustrated in FIG. 4b, although the quadcopter 1001 and IED 1003 are located within the ROI 1008 of the ECM 105, since the ROI 1008 of the ECM 105 is relatively small, other nearby electronic devices, for example mobile telephones carried by members of the public 1009, are not affected by the ECM 105.

The skilled person will appreciate that the present invention is not limited to the examples described above. In particular, the present invention is not limited to cases involving UAVs.

For example, in another exemplary scenario, if there is a suspected car-bomb, for example outside a public building, embodiments of the present invention may be used, for example by a bomb disposal squad, to rapidly drop a projectile comprising an ECM onto the car from a distance.

In yet another exemplary scenario, a projectile comprising an ECM according to various embodiments of the present invention may be dropped onto a moving vehicle in order to disrupt, disable or inhibit its ignition system, hence stop it. This implementation may require a relatively powerful ECM.

In the examples described above, a projectile may be used to carry or transport an ECM towards a target object, wherein the projectile may be launched using a launcher. The skilled person will appreciate that the present invention is not limited to this specific example. For example, in certain embodiments, the ECM may be carried or transported towards a target object by a missile or the like, or any other suitable type of carrier or transporter. As another example, the ECM may be simply dropped onto a target object located beneath, for example such that the ECM is carried to the target object by the force of gravity alone.

The invention claimed is:

1. A system for interfering with the electronic system of a target object, the system comprising:

an Electronic Counter Measure (ECM) unit comprising a device that transmits signals configured to interfere with the electronic system of the target object; and a projectile that carries the ECM unit towards the target object, wherein the ECM is configured to have an adjustable ROI, and wherein the projectile comprises control circuitry configured to receive an ECM programming signal indicating a ROI value, and to adjust the ROI of the ECM according to an ECM programming signal, and further wherein the ROI indicates a distance from the ECM unit within which the transmitted signals are effective to interfere with the electronic system of the target object.

2. A system according to claim 1, wherein the projectile comprises an attachment element for attaching the projectile or ECM to the target object when the projectile is in the vicinity of the target object or collides with the target object.

3. A system according to claim 2, wherein the attachment element comprises one or more of: a sticky substance; one or more elements for hooking, snagging or tangling the target object; one or more sharp points; and a deployable manifold for tangling the target object.

4. A system according to claim 1, wherein the ECM unit is configured to be selectively activated.

5. A system according to claim 4, wherein the projectile further comprises control circuitry including an event occurrence detection module for detecting the occurrence of an event, and a controller for controlling activation of the ECM upon occurrence of the event.

6. A system according to claim 5, wherein the event occurrence detection module comprises one or more of: an accelerometer for detecting occurrence of a collision between the projectile and the target object; a pressure sensor or button for detecting a force resulting from occurrence of a collision between the projectile and the target object; a timer for detecting lapse of a predetermined period of time; a receiver for receiving an activation signal; and a button or switch for receiving a user input.

7. A system according to claim 1, wherein the ECM is adapted to have a Radius of Influence (ROI) less than or equal to a certain value R.

8. A system according to claim 7, wherein the value of R is selected in consideration of the physical dimensions of the target object and/or an attachment element.

9. A system according to claim 8, wherein R is approximately the same size as the target object.

10. A system according to claim 1, further comprising a launcher for launching the projectile towards the target object.

11. A system according to claim 1, wherein the target object comprises one or more of: a vehicle; a remote-controlled vehicle; an electronic device or system; and a remote-controlled explosive device.

12. A method for interfering with the electronic system of a target object, the method comprising launching a projectile comprising an Electronic Counter Measure (ECM) which includes a device that transmits signals configured to interfere with the electronic system of the target object towards the target object, wherein the ECM is configured to have an adjustable ROI, and wherein the projectile comprises control circuitry configured to receive an ECM programming signal indicating a ROI value, and to adjust the ROI of the ECM according to an ECM programming signal, and further wherein the ROI indicates a distance from the ECM unit within which the transmitted signals are effective to interfere with the electronic system of the target object.

13. A method according to claim 12, further comprising:
receiving, by control circuitry of the projectile, an ECM programming signal indicating ROI value; and
adjusting the ROI of the ECM according to the ECM programming signal.

14. A method according to claim 12, further comprising selectively activating the ECM upon occurrence of a certain event.

15. A method according to claim 14, wherein the event is collision between the projectile and the target object.

16. A method according to claim 12, further comprising inhibiting, disabling or immobilising the target object by the ECM.

* * * * *